United States Patent [19]

Loodberg et al.

[11] Patent Number: 4,915,213

[45] Date of Patent: Apr. 10, 1990

[54] ARRANGEMENT IN A BELT CONVEYOR

[75] Inventors: Jan Å. T. Loodberg, Nyhamnsläge; Arne E. Wall, Landskrona; Olle L. Siwersson, Helsingborg, all of Sweden

[73] Assignee: AB Scaniainventor, Helsingborg, Sweden

[21] Appl. No.: 194,111

[22] PCT Filed: Dec. 4, 1986

[86] PCT No.: PCT/SE86/00552

§ 371 Date: May 19, 1988

§ 102(e) Date: May 19, 1988

[87] PCT Pub. No.: WO87/03565

PCT Pub. Date: Jun. 18, 1987

[30] Foreign Application Priority Data

Dec. 9, 1985 [SE] Sweden .................................. 8505793

[51] Int. Cl.$^4$ ............................................. B65G 15/10
[52] U.S. Cl. .................................................... 198/819
[58] Field of Search ........................................... 198/819

[56] References Cited

U.S. PATENT DOCUMENTS 3,164,238  1/1965  McCullagh .

FOREIGN PATENT DOCUMENTS 1109411  9/1981  Canada .
965024   5/1957  Fed. Rep. of Germany .
242341  11/1979  France .
423890   6/1982  Sweden .
970253   9/1964  United Kingdom .

Primary Examiner—Joseph E. Valenza
Attorney, Agent, or Firm—Browdy and Neimark

[57] ABSTRACT

A belt conveyor with at least one endless belt (1,1') has two tensile force (longitudinal)-absorbing members (3,4,3',4') which extend throughout the entire length of the belt conveyor and which are each connected to a respective edge portion of the belt and project from the plane of that edge portion. The belt conveyor is sealed at a longitudinal edge throughout at least part of its length. One edge portion of the belt overlaps and extends outside the other edge portion of the belt along the sealed part of the length of the belt conveyor, more specifically with its tensile force (longitudinal)-absorbing member (3,3') projecting in the same direction as the tensile force (longitudinal)-absorbing member (4',4) of the other edge portion of the belt. When the belt conveyor has a single belt (1), the two tensile force (longitudinal)-absorbing members (3,4) of the belt project from opposite sides of the belt (1) in the straightened state thereof. When in the case of a two-belt conveyor, each belt has two tensile force (longitudinal)-absorbing members, these may project either from the same side or from opposite sides of the belt in the straightened state thereof.

9 Claims, 4 Drawing Sheets

ARRANGEMENT IN A BELT CONVEYOR

The present invention relates to an arrangement in a belt conveyor having at least one endless belt and two tensile force (longitudinal)-absorbing members extending throughout the entire length of the belt conveyor and being each connected to a respective edge portion of the belt and projecting from the plane of said portion for cooperation with guide rollers determining the path of travel of the belt conveyor which is sealed over at least part of its length at a longitudinal edge thereof.

A belt conveyor of this type is previously known, e.g. from GB patent specification No. 970,253 describing a single-belt conveyor having two V-belt-shaped tensile force (longitudinal)-absorbing members which in the straightened state of the belt project from one and the same side of the belt at the longitudinal edges thereof. This prior-art belt conveyor confers substantial advantages, for instance in that the goods conveyed can be transported in a protected fashion on a central part of the belt depending in a bag-like manner between the tensile force (longitudinal)-absorbing members. This belt conveyor is however disadvantageous in so far as it allows no vertical conveyance of the goods and especially no easy transition from a horizontal direction of conveyance to a more or less vertical direction of conveyance, and vice versa. Furthermore, this known belt conveyor construction necessitates guide rollers for holding together or sealing a longitudinal edge.

The object of the present invention is to overcome the above-mentioned shortcomings inherent in the known belt conveyor construction. The inventive arrangement should thus allow easy transition from a horizontal direction of conveyance to a substantially vertical direction of conveyance, and vice versa. It should also provide for improved and less expensive sealing of one longitudinal edge of the belt conveyor.

According to the present invention, these and other objects are achieved in an arrangement of the type stated in the introduction to this specification, in that one edge portion of the belt, along the sealed part of the length of the belt conveyor, overlaps and extends outside the other edge portion of the belt, with its tensile force (longitudinal)-absorbing member projecting in the same direction as the tensile force (longitudinal)-absorbing member of the other edge portion of the belt.

The arrangement according to the invention can be used both in a single-belt conveyor and in a two- or multi-belt conveyor. In a single-belt conveyor, the inventive arrangement is achieved in that the two tensile force (longitudinal)-absorbing members of the belt are so designed as to project from opposite sides of the belt when in its straightened state. This particular belt is also usable in a two- or multi-belt conveyor. The two-belt conveyor may use two identical belts which are offset in relation to each other transversely of the direction of travel of the conveyor a distance which corresponds at least to the width of one tensile force (longitudinal)-absorbing member. A two-belt conveyor may however also use two belts, each having two tensile force (longitudinal)-absorbing members which project from the same side of the respective belt in the straightened state thereof. In accordance with the invention, the width of one belt must then exceed the width of the other belt by at least the total width of its two tensile force (longitudinal)-absorbing members.

A single-belt conveyor using the inventive arrangement is particularly advantageous in that the two tensile force (longitudinal)-absorbing members along a vertical part of the path of travel of the belt conveyor, can be twisted about each other between two of the guide rollers of the belt conveyor which determine the path of travel thereof. By twisting the tensile force (longitudinal)-absorbing members about each other, such reliable sealing is obtained as to allow vertical conveyance of goods. In a two-belt conveyor, vertical conveyance can be performed without the belts being twisted about each other, although this alternative is also possible.

To conclude, by the special positioning of the tensile force (longitudinal)-absorbing members side by side, these members may be of the same length in each belt without causing any increased wear of the belt by the belt edge portions sliding on each other. Further, the arrangement of the invention allows easy transition from horizontal conveyance to more or less vertical conveyance of goods, and vice versa. The goods may consist of materials ranging from coarse particles to fine powder and even liquids or more or less liquid products. The invention also ensures tighter sealing along a longitudinal edge of the belt conveyor as compared with previously known constructions.

By the length of and the distance to a tensile force (longitudinal)-absorbing member is here meant the length of the member in the neutral plane thereof and the distance to the neutral plane of the member, respectively, this plane being defined as the plane in the transverse section of the member where neither elongation nor compression appears when the member is bent.

The invention will now be described in more detail hereinbelow with reference to the accompanying drawings showing different embodiments of the inventive arrangement.

FIG. 1 is a cross-section of a conveyor belt used in the arrangement of the invention.

FIG. 2 schematically shows the use of the belt in FIG. 1 in a two-belt conveyor.

FIG. 3 schematically shows the use of the belt in FIG. 1 in a single-belt conveyor.

Figure 1:
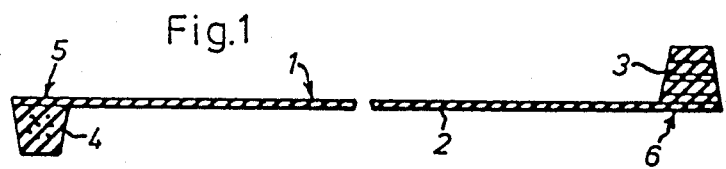

A belt 1, shown in cross-section in FIG. 1, consists of a web 2 of flexible and elastic material, preferably a polymer material, and two tensile force (longitudinal)-absorbing members 3 and 4. The members 3, 4 are each connected to an edge portion 6 and 5, respectively, of the belt, i.e. the longitudinal portion of the belt closest to the respective edge, and project from the plane thereof. The height of the member 3 equals the sum of the height of the member 4 and the thickness of the belt edge portion 5. The tensile force (longitudinal)-absorbing members 3 and 4 extend throughout the entire length of the belt conveyor and may, as shown in FIG. 1, have the profile of a V-belt, other profiles being however also conceivable. The two tensile force (longitudinal)-absorbing members 3, 4 are but little extensible in the longitudinal direction, for instance by being provided with some type of reinforcement, e.g. in the form of wires as shown in the member 4, or in the form of strips as shown in the member 3.

The tensile force (longitudinal)-absorbing members 3 and 4 may be connected to the web 2, e.g. by vulcanization, heat welding or gluing. They may also be extruded integrally with the rest of the belt so as to produce a complete belt in a single operation, for instance of polyurethane. The web 2 extending between the members 3, 4 is flexible in the transverse direction and may suitably consist of an easily extensible and elastic material. In the use of the belt 1 in a two-belt conveyor, the web 2 may however in some cases consist of a material which is more rigid in the transverse direction but yet flexible and extensible for adaptation to the goods conveyed.

Figure 2:
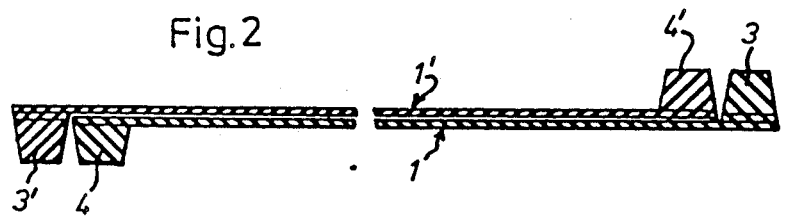

The belt 1 shown in FIG. 1, whose two tensile force (longitudinal)-absorbing members 3, 4 project from opposite sides of the belt, may be used in a two-belt conveyor together with a similar belt 1', as schematically illustrated in FIG. 2. The belts 1, 1' are offset transversely of their direction of travel a distance corresponding at least to the width of one tensile force (longitudinal)-absorbing member. The two-belt conveyor may be sealed throughout part of its length, more particularly along one longitudinal edge by means of the members 3, 4' and along its other longitudinal edge by means of the members 3', 4. Highly safe and reliable sealing is achieved in accordance with the invention in that the edge portion of the belt 1 joined to the member 3 overlaps and extends outside the edge portion of the belt 1' joined to the member 4', the tensile force (longitudinal)-absorbing member 3 of the belt 1 projecting in the same direction as the tensile force (longitudinal)-absorbing member 4' of the belt 1'. The same applies to the members 3', 4 at the other longitudinal edge of the belt conveyor.

Figure 4:
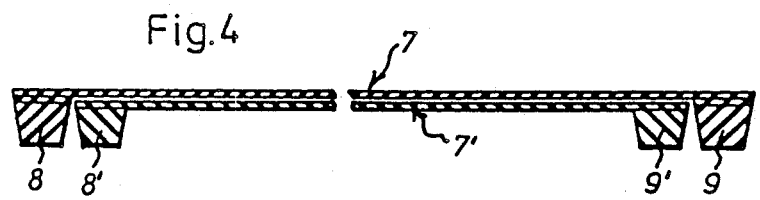
FIG. 4 is a cross-sectional view showing an alternative belt design according to the invention for a two-belt conveyor.

In a two-belt conveyor, the invention also makes it possible to use the belt configuration shown in FIG. 4 where two belts 7, 7' are disposed adjacent each other to permit conveying goods between them. Also in this case, each belt 7, 7' has two tensile force (longitudinal)-absorbing members 8, 9 and 8', 9', respectively, which are of the same type as the members 3, 4 and 3', 4' but which project from the same side of the belt 7 and 7', respectively. Further, the width of the belt 7 exceeds the width of the belt 7' by at least the total width of the two tensile force (longitudinal)-absorbing members 8 and 9 of the belt 7.

Figure 3:
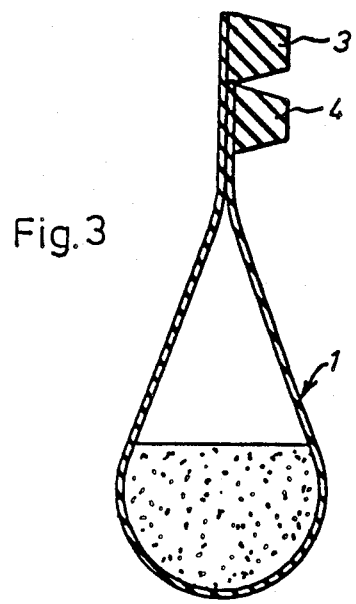

The belt shown in FIG. 1 is most useful in a single-belt conveyor and is then given the configuration shown in FIG. 3 along the sealed part of the belt conveyor. By the illustrated location of the tensile force (longitudinal)-absorbing members 3, 4 over each other and projecting in the same direction from the respective edge portion of the belt, excellent sealing is obtained along the upper longitudinal edge of the belt conveyor where the member 3 ensures complete sealing by engaging the member 4.

The profile of the member 3 may also be such that the gap between the members 3 and 4 in FIG. 3 is filled. As a result, the belt edge with the member 3 will hook onto the member 4. This presupposes that the angle between the outer side of the member 4 and the belt edge portion 5 is acute. In order to further enhance the engagement between the members 3 and 4 in this case, the longitudinal tension in the member 4 may be made greater than that in the member 3.

Figure 5:
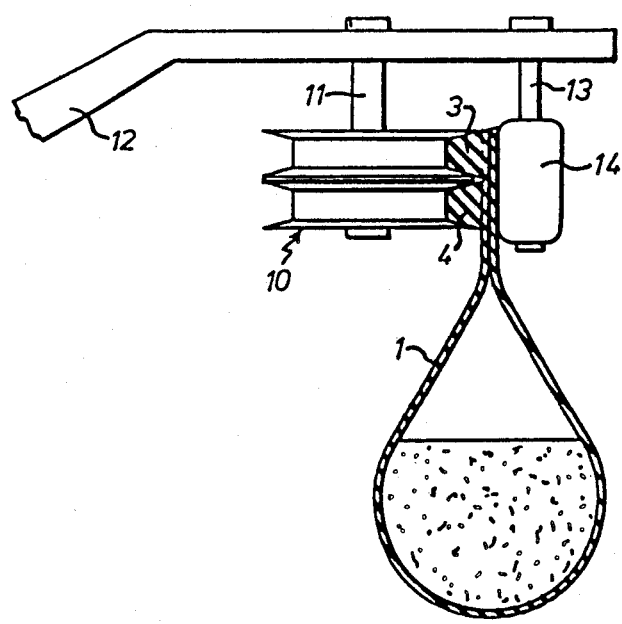
FIGS. 5–9 show examples of different guide rollers in a single-belt conveyor using the belt of FIG. 1.
Figure 6:
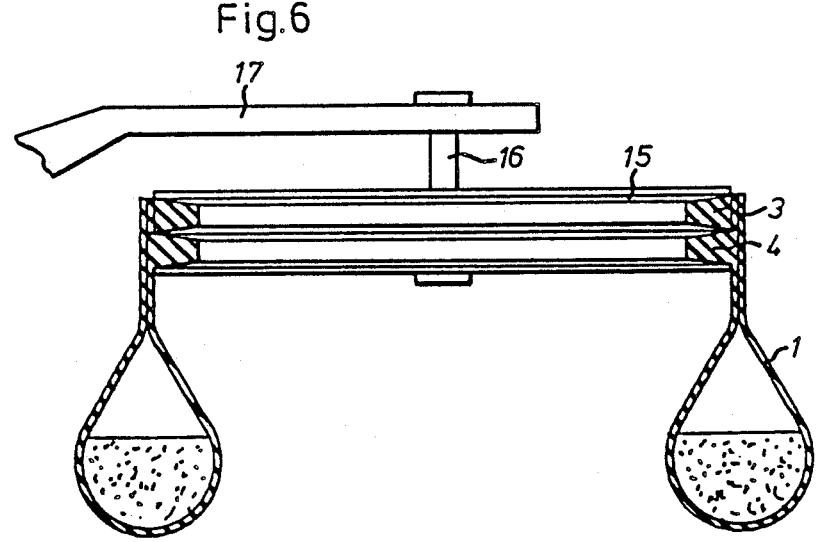

FIGS. 5 and 6 show examples of two guide rollers for a single-belt conveyor having the belt configuration of FIG. 3. In FIG. 5, there is shown a roller 10 rotatably mounted on a vertical shaft 11 depending from an arm 12 mounted in a frame (not shown). The roller 10 has two axially offset grooves for engagement with a respective one of the tensile force (longitudinal)-absorbing members 3 and 4. On a vertical shaft 13, also mounted in the arm 12, a pressure roller 14 is rotatably mounted. The pressure roller 14 is intended, by suitable means (not shown), to be pressed against the outwardly facing sides of the tensile force (longitudinal)-absorbing members 3 and 4. The pressure exerted on the member 4 is transmitted by part of the belt edge portion 6 and acts so as to maintain the members 3 and 4 in the grooves of the roller 10.

The construction of a guide and support roller 10 as shown in FIG. 5 can be used in such portions of the path of the belt conveyor where the belt conveyor is travelling substantially linearly or curves through a lesser angle. The roller 10 may also be used as a driving roller.

In FIG. 6, there is shown a deflecting roller 15 having the same groove design in its periphery as the roller 10 but a larger diameter than this. The roller 15 is mounted for rotation about a vertical shaft 16 which is mounted in an arm 17 supported by a frame (not shown). The belt 1 can change its direction of travel about the roller 15 up to about 180° and the roller 15 then is well suited as a driving roller. If the change of the direction of travel of the belt 1 about the roller 15 is not very small, there is no need for such a pressure roller as normally required for the roller 10 in FIG. 5.

Figure 7:
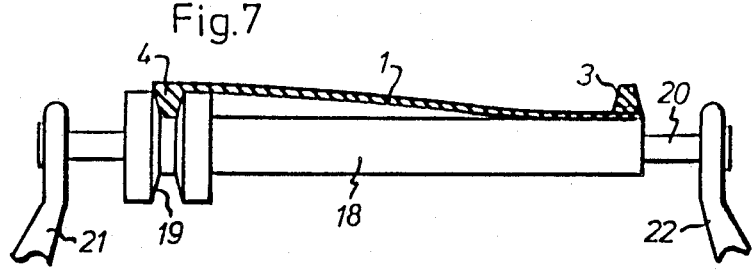

Along parts of the path of travel of the belt conveyor, the belt 1 can be advanced in a substantially straightened state, either depending between two rollers similar to the roller 10 in FIG. 5 or on a roller as is shown in FIG. 7. FIG. 7 more specifically shows a roller 18 having a groove 19 at one end and rotatably mounted on a shaft 20 which is supported in arms 21 and 22 mounted on a frame (not shown). The groove 19 of the roller 18 engages with the tensile force (longitudinal)-absorbing member 4, while the member 3 is facing away from the roller 18. The roller 18 is so designed that the members 3 and 4 when passing over the roller 18 are at the same distance from the centre of rotation of the roller 18.

As an alternative to the roller 18, a roller having a constant radius may be used or two separate rollers.

Figure 8:
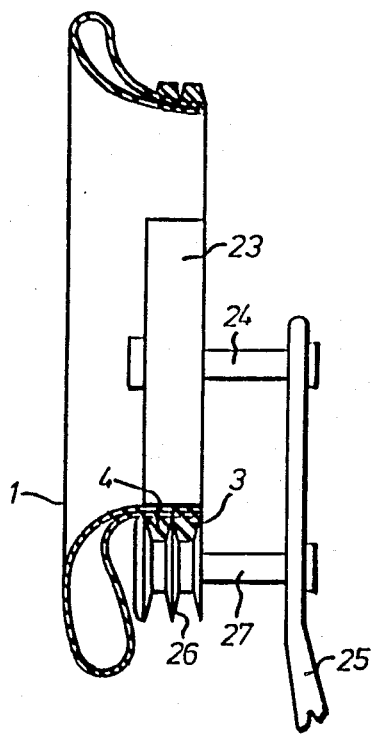
Figure 9:
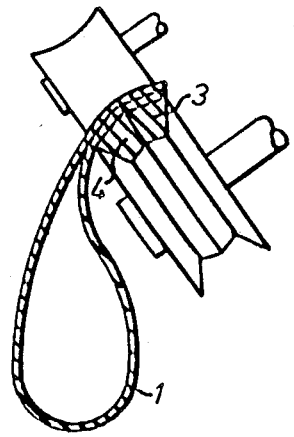

The inventive arrangement allows easy transition of the single-belt conveyor from a horizontal direction of travel to a more or less vertical direction of travel, and vice versa. In FIG. 8, there is shown an example of a roller construction for permitting transition from a horizontal to a vertical direction of travel. More precisely, a roller 23 is rotatably mounted on a horizontal shaft 24 which is mounted in an arm 25 supported by a frame (not shown). The roller 23 has a substantially constant radius and cooperates with a pressure roller 26 having grooves for engagement with the tensile force (longitudinal)-absorbing members 3 and 4. The pressure roller 26 thus serves to guide the tensile force (longitudinal)-absorbing members 3 and 4 into engagement with the lower part of the roller 23 and is rotatably mounted on a shaft 27 which is fixedly mounted in the arm 25. The transition from e.g. the belt configuration according to FIG. 5 to the belt configuration according to FIG. 8 may be carried out stepwise by means of a plurality of progressively inclined pairs of rollers of the type shown in FIG. 5. The guide roller 26 ensures that the belt 1 is firmly held in position also underneath the roller 23, such that the belt 1 will not run off it. In the part of the path of travel of the belt conveyor vertically ascending from the roller 23, sealing of the longitudinal belt edge can be further improved in that the tensile force (longitudinal)-absorbing members 3 and 4 are twisted about each other, i.e. such that the entire conveyor belt 1 follows a helical path in its vertical extent. Alternatively or additionally, the distance between the guide rollers for the conveyor belt 1 may be reduced along the more or less vertical parts of the path of travel of the conveyor belt. In these parts, the guide rollers may have a shape conforming to the shape assumed by the twisted tensile force (longitudinal)-absorbing members 3, 4, as illustrated in FIG. 9.

Figure 10:
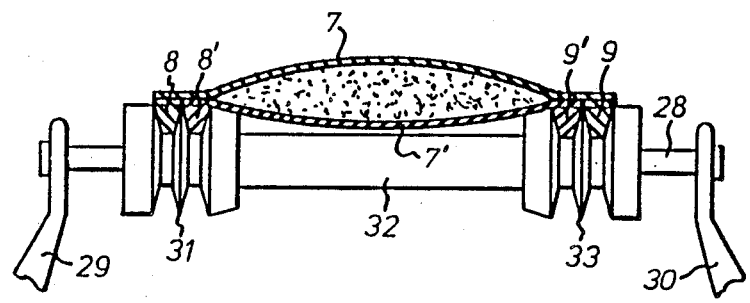
FIG. 10 shows an example of guide rollers in a two-belt conveyor for the belt configuration of FIG. 4.

One application of the two-belt configuration of FIG. 4 is shown in FIG. 10. On a shaft 28, which is mounted in arms 29 and 30 supported by a frame (not shown), a guide roller for the belt is rotatably mounted. This guide roller consists of three axially offset sections 31–33. The sections 31 and 33 each have two grooves for engagement with the tensile force (longitudinal)-absorbing members 8, 8' and 9, 9', respectively. Although not shown, pressure rollers may be provided for cooperating with the roller sections 31 and 33 in order to improve the sealing of the belt edge and/or to increase the friction between the tensile force (longitudinal)-absorbing members and the respective roller section. Alternatively, the sections 31–33 may be disengaged from each other or the section 32 may be dispensed with.

Figure 11:
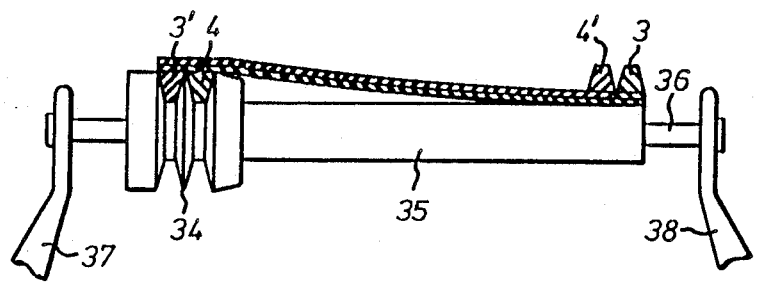
FIG. 11 shows an example of a guide roller in a two-belt conveyor for the belt configuration of FIG. 2.

FIG. 11, like FIG. 10, illustrates a two-belt configuration using a belt according to FIG. 2. More specifically, two axially offset roller sections 34 and 35 are rotatably mounted on a shaft 36 which is mounted in two arms 37 and 38 supported by a frame (not shown). The roller section 34 has grooves for cooperating with the tensile force (longitudinal)-absorbing members 3' and 4. Similar cooperation takes place between the tensile force (longitudinal)-absorbing members 3, 4' and the roller section 35, however without any grooves. As in FIG. 10, pressure rollers may be provided for each roller section 34 and 35, the pressure roller cooperating with the roller section 35 suitably having grooves for engagement with the tensile force (longitudinal)-absorbing members 3 and 4'. This also applies to the embodiment in FIG. 7.

Although the guide rollers shown in FIGS. 10 and 11 are rotatable about horizontal shafts, it is of course also possible to arrange these shafts with a vertical extent. In this manner, the two-belt conveyor can also be moved over rollers similar to the roller 15 in FIG. 6. Naturally, the two-belt conveyor may also have a more or less vertical extent along part of its length.

Modifications of the embodiments described above are of course possible within the scope of the invention. Thus, the shaft 11 in FIG. 5 may be horizontal and located below the shaft 13. According to a particularly suitable alternative, the belt 1 or each of the belts 1, 1' and 7, 7', respectively, consists of two separately manufactured belt edge portions and one separately manufactured central part, which are joined to each other, e.g. by vulcanization, so as to form the respective belts. A standard belt may be used as central part. The load-contacting surface of each central part should then merge smoothly into the corresponding surfaces of the adjoining belt edge portions. Further, the invention is useful e.g. in a three-belt conveyor which may use three belts according to FIG. 1. Finally, it should be pointed out that the above-mentioned guide rollers may be backing rollers, terminal rollers, deflecting rollers, support rollers, grooved rollers, pressure rollers etc.

We claim:

1. Arrangement in a belt conveyor having at least one endless belt (1, 1'; 7, 7') and two tensile force (longitudinal)-absorbing members (3, 4, 3', 4', 8, 8', 9, 9') extending throughout the entire length of the belt conveyor and being each connected to a respective edge portion (6, 5) of the belt and projecting from the plane of said portion for cooperation with guide rollers determining the path of travel of the belt conveyor which is sealed over at least part of its length at a longitudinal edge thereof, characterized in that one edge portion (6) of the belt, along said sealed part of the length of the belt conveyor, overlaps and extends outside the other edge portion (5) of the belt, with its tensile force (longitudinal)-absorbing member (3) projecting in the same direction as the tensile force (longitudinal)-absorbing member (4) of the other edge portion (5) of the belt.

2. Arrangement as claimed in claim 1, in which the belt conveyor has a single belt (1), characterized in that the two tensile force (longitudinal)-absorbing members (3, 4) of the belt project from opposite sides of the belt (1) in the straightened state thereof.

3. Arrangement as claimed in claim 2, characterized in that the two tensile force (longitudinal-absorbing members (3, 4) are twisted about each other along part of their path of travel between at least two of the guide rollers of the belt conveyor.

4. Arrangement as claimed in claim 3, characterized in that support rollers conform to the shape the twisted tensile force (longitudinal)-absorbing members (3, 4) assume along said part of their path of travel.

5. Arrangement as claimed in claim 2 characterized in that the belt conveyor has at least one guide roller (18, 19) over which the belt (1) is running in a substantially flattened state with only one tensile force (longitudinal)-absorbing member (4) in direct contact with the guide roller.

6. Arrangement as claimed in claim 1, in which the belt conveyor has two belts (1, 1') characterized in that each belt (1, 1') has two tensile force (longitudinal)-absorbing members (3, 4; 3', 4') projecting from opposite sides of the belt in the straightened state thereof.

7. Arrangement as claimed in claim 6, characterized in that the two belts (1, 1') are identical and, over a guide roller (34, 35) for determining the path of travel of the belt conveyor, axially offset in relation to each other a distance corresponding at least to the width of one tensile force (longitudinal)-absorbing member.

8. Arrangement as claimed in claim 1, characterized in that the belt conveyor has at least one guide roller (10, 15, 23, 31, 33, 34) about which the tensile force (longitudinal)-absorbing members (3, 4; 3', 4'; 8, 8', 9, 9') are at the same radial distance from the centre of rotation of the roller.

9. Arrangement as claimed in claim 1 characterized in that the belt (1) or each belt (1, 1'; 7, 7') consists of two separately manufactured belt edge portions and one separately manufactured central portion, which are connected to each other.

* * * * *